United States Patent
Liu

(10) Patent No.: US 10,630,817 B2
(45) Date of Patent: *Apr. 21, 2020

(54) LOAD BALANCING AND SESSION PERSISTENCE IN PACKET NETWORKS

(71) Applicant: Comcast Cable Communications, LLC, Philadelphia, PA (US)

(72) Inventor: Chia J. Liu, Marlton, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/720,727

(22) Filed: Sep. 29, 2017

(65) Prior Publication Data

US 2018/0248985 A1 Aug. 30, 2018

Related U.S. Application Data

(63) Continuation of application No. 14/331,993, filed on Jul. 15, 2014, now Pat. No. 9,826,068, which is a continuation of application No. 13/407,167, filed on Feb. 28, 2012, now Pat. No. 8,819,275.

(51) Int. Cl.
| | |
|---|---|
| *H04L 29/06* | (2006.01) |
| *H04L 29/08* | (2006.01) |
| *H04L 12/741* | (2013.01) |
| *H04L 29/12* | (2006.01) |

(52) U.S. Cl.
CPC ............. *H04L 69/22* (2013.01); *H04L 45/74* (2013.01); *H04L 67/1027* (2013.01); *H04L 69/16* (2013.01); *H04L 69/161* (2013.01); *H04L 61/6009* (2013.01); *H04L 61/6013* (2013.01)

(58) Field of Classification Search
CPC ..... H04L 69/22; H04L 45/74; H04L 67/1027; H04L 69/16; H04L 69/161; H04L 61/6009; H04L 61/6013
USPC ........................................ 370/351, 389, 392
See application file for complete search history.

(56) References Cited

U.S. PATENT DOCUMENTS

| | | | |
|---|---|---|---|
| 2002/0032777 A1* | 3/2002 | Kawata | ............... H04L 67/1008 709/226 |
| 2003/0093560 A1 | 5/2003 | Ono et al. | |
| 2003/0117988 A1 | 6/2003 | Asano et al. | |
| 2003/0185236 A1 | 10/2003 | Asano et al. | |
| 2005/0172133 A1 | 8/2005 | Brumme et al. | |
| 2005/0190694 A1* | 9/2005 | Ben-Nun | ............. H04L 45/7453 370/229 |
| 2005/0243820 A1 | 11/2005 | Chen | |
| 2006/0013190 A1 | 1/2006 | Leroy et al. | |
| 2006/0095969 A1 | 5/2006 | Portolani et al. | |
| 2006/0233106 A1* | 10/2006 | Achlioptas | ............ H04L 45/745 370/235 |

(Continued)

OTHER PUBLICATIONS

Deering, Cisco, Hinden, Nokia—Internet Protocol, Version 6 (IPv6) Specification, RFC 2460, Dec. 1998.

(Continued)

*Primary Examiner* — Obaidul Huq
(74) *Attorney, Agent, or Firm* — Banner & Witcoff, Ltd.

(57) ABSTRACT

A node may generate a data packet comprising an Internet Protocol (IP) header and a destination options extension header (DOEH). The DOEH may comprise one or more data fields and an IP payload. The node may send the data packet to another node in a data network.

21 Claims, 6 Drawing Sheets

(56) References Cited

U.S. PATENT DOCUMENTS

| | | | |
|---|---|---|---|
| 2007/0030824 A1 | 2/2007 | Ribaudo et al. | |
| 2007/0094373 A1* | 4/2007 | Brendel | H04L 63/04 709/223 |
| 2010/0063988 A1* | 3/2010 | Khalid | G06F 15/16 709/202 |
| 2010/0128665 A1 | 5/2010 | Kahn | |
| 2011/0286425 A1 | 11/2011 | Chen | |
| 2013/0227165 A1 | 8/2013 | Liu | |

OTHER PUBLICATIONS

Extended European Search Report—EP 13156970.9—dated May 31, 2013.
R. Moskowitz et al., "Host Identity Protocol", The Boeing Company, Apr. 2008, 105 pages.
S. Krishnan et al., "Localized Routing for Proxy Mobile 1Pv6 draft-ietf-netext-pmip-lr-03", NIKSUN, Jun. 3, 2011, 26 pages.
European Office Action—EP 13156970.9—dated Jan. 10, 2017.
Extended European Search Report, EP Application 14182848.3, dated Jan 30, 2015.
Response to European Search Report—EP 14182848.3—dated Sep. 2, 2015.
Nov. 23, 2018—European Office Action—EP 14182848.3.
Dec. 18, 2018—Canadian Office Action—CA 2,807,793.
Dec. 19, 2019—Canadian Office Action—CA 2,807,793.

* cited by examiner

| ID | Source | Dest. | Dest. Port | SPH-Client | SPH-Server | Selection Based on | Assigned Server |
|---|---|---|---|---|---|---|---|
| 1 | Proxy1 | VIP1 | null (Sync) | C1 | 0 | LB | SERV1 |
| 2 | Proxy1 | VIP1 | 80 (HTTP) | C1 | Serv1 | LBSPOD-2 | SERV1 |
| 3 | Proxy1 | VIP1 | 21 (FTP) | C1 | 0 | LB | SERV2 |
| 4 | Proxy1 | VIP1 | 443 (HTTPS) | C1 | Serv1 | LBSPOD-2 | SERV1 |
| 5 | Proxy1 | VIP2 | null (Sync) | C2 | 0 | LB | SERV3 |
| 6 | Proxy1 | VIP2 | 80 (HTTP) | C2 | SERV3 | LBSPOD-2 | SERV3 |

*FIG. 12*

LOAD BALANCING AND SESSION PERSISTENCE IN PACKET NETWORKS

CROSS REFERENCE TO RELATED APPLICATIONS

This application is a continuation of co-pending application Ser. No. 14/331,993, filed Jul. 15, 2014, which is a continuation of Ser. No. 13/407,167, filed Feb. 28, 2012, issued as U.S. Pat. No. 8,819,275 on Aug. 26, 2014, and having the title "Load Balancing and Session Persistence in Packet Networks," herein incorporated by reference in their entirely.

FIELD

Aspects described herein relate generally to packet data networks. Some aspects relate to session persistence and load balancing in IP networks.

BACKGROUND

In packet switched networks such as the Internet, there is presently no efficient way to maintain session persistence when a session transforms from an unsecured session (e.g., HTTP) to a secure session (e.g., HTTPS). In architectures using megaproxies (e.g., redirecting users to cached versions of web sites, or for control, surveillance and data mining purpose, as is sometimes done by ISPs and enterprises), the use of cookie switching or URL switching in a load balancer (LB) are sometimes used.

In web applications, a LB may use a URL or cookie in a HTTP request to select an appropriate server. However, in order to examine the application packets, the LB must postpone the binding of a TCP connection to a server until after the application request is received. This is known as "delayed binding". In a delayed binding scenario, the LB completes the TCP connection setup with the client on behalf of the server. Once the HTTP request is received, the LB selects the server, establishes a connection with the server, and forwards the HTTP request. The LB must translate the sequence number of all reply packets from the server to match what the LB used on the client-side connection. The LB must also change the ACK sequence number for packets from client to the server. Delayed Binding therefore impacts the performance of the LB because of the need for sequence number translation, and delayed binding can also increase the response time of a user's request to an application running on a server.

In shopping-cart applications, the LB typically must associate the first HTTPS connection request from a client with an earlier HTTP request received from the client. Source IP-based persistence does not work well when dealing with a mega proxy server, because when a user transitions from HTTP to HTTPS, the LB can no longer read the cookie because the cookie is encrypted.

Current practices for HTTP to HTTPS transition include the use of a shared back-end storage or database system. When the SSL (or TLS) session is initiated, the SSL server obtains the shopping-cart information from the back-end database and then processes it. However, this solution requires the server with the shopping cart to write the information to a back-end database. Another known option is to use middleware software to make all the servers appear as one big virtual server to the client application. A cookie is used to track the user identification. Once the application receives the first HTTPS request, the application uses the cookie to retrieve the data structure that contains the correct context.

In another known solution, a LB may be configured to bind a different port number on the virtual IP address (VIP) to port 443 of a different real server. When the real server generates the Web page reply that contains the checkout button, the LB links its own port number to that button (e.g., by generating a hyperlink for the checkout button).

In another known solution using an SSL accelerator, the SSL acceleration product terminates secure connections and converts the HTTPS request to an HTTP request. The LB redirects requests received on port 443 to the SSL accelerator, and maintains session persistence via a cookie or other method that is no longer encrypted.

Each of these known solutions consumes resources and overhead within a LB, thereby reducing the number of sessions and/or the amount of traffic the LB could otherwise handle.

BRIEF SUMMARY

The following presents a simplified summary in order to provide a basic understanding of some aspects described herein. This summary is not an extensive overview. It is not intended to identify key or critical elements of the disclosure or to delineate the scope of the disclosure. The following summary merely presents some concepts directed to techniques for providing session persistence and load balancing in packet networks, for example in IPv6 networks, in a simplified form as a prelude to the more detailed description provided below.

A first aspect is directed to a non-transitory computer readable medium having a data structure stored thereon, where the data structure stores data for a load balancing session persistence option. The data structure may include an IP header, a destination options extension header (DOEH), and an IP payload. The DOEH may further include a first data field identifying the DOEH as conforming to a predefined option usable with load balancing, a second data field identifying a length of a DOEH payload field, and the DOEH payload field itself. The DOEH payload field may be made up of third and fourth data fields, where the third data field stores a client identifier, and the fourth data field stores a server identifier.

According to another aspect, an apparatus may be specifically adapted or configured to manage and process IP data packets having a load balancing session persistence option defined, e.g., in a destination options extension header. The apparatus may include a processor, and memory storing computer executable instructions that, when executed by the processor, cause the apparatus to perform certain actions, including receiving an Internet Protocol (IP) data packet. The IP data packet includes an IP header, a destination options extension header (DOEH), and an IP payload. The DOEH includes a first data field identifying the DOEH as conforming to a predefined option usable with load balancing and session persistence, a second data field identifying a length of a DOEH payload field, and the DOEH payload field itself. The DOEH payload field may further include third and fourth data fields, where the third data field stores a client identifier, and the fourth data field stores a server identifier.

Yet another aspect is directed to a method for handling IP data packets based on load balancing and session persistence needs. The method may include an intermediary node of an Internet Protocol (IP) data network receiving an IP data packet. The IP data packet may include an IP header, a destination options extension header (DOEH), and an IP payload. The DOEH includes a first data field identifying the DOEH as conforming to a predefined option usable with load balancing and session persistence, a second data field identifying a length of a DOEH payload field, and the DOEH payload field itself. The DOEH payload field may further include third and fourth data fields, where the third data field stores a client identifier, and the fourth data field stores a server identifier. The intermediary node may then process the IP data packet based on the IP header without allowing modification to the DOEH, and the intermediary node sending the IP data packet to either a next hop node or a destination server, based on the processing of the data packet.

Processing of the IP data packet based on the IP header may be performed without allowing modification to the DOEH header. Processing the IP data packet may include forwarding the IP data packet to a next hop in a data network, assigning a server to a session with the client based on the DOEH, or assigning a server to a session with the client based on load balancing when no server information is present in the DOEH. Processing the data packet may further include associating an HTTPS packet with a previously received HTTP packet based on information stored in the DOEH.

According to some aspects, each of the client and server identifiers may be an address such as a network address. In one embodiment, the first data field is 8 bits storing a binary value of 1, the second data field is 8 bits storing a binary value of 4, the third data field is 128 bits storing an IPv6 address of the client, and wherein the fourth data field is 128 bits storing an IPv6 address of the server. According to some aspects, a value of the third data field, once established by a client, cannot be changed within a same session, and a value of the fourth data field, once established by a server, also cannot be changed within the same session.

BRIEF DESCRIPTION OF THE DRAWINGS

A more complete understanding of the disclosure and the advantages thereof may be acquired by referring to the following description in consideration of the accompanying drawings, in which like reference numbers indicate like features, and wherein:

FIG. 12 illustrates example load balancing information maintained by a load balancer node according to one or more aspects described herein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope of the disclosure. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
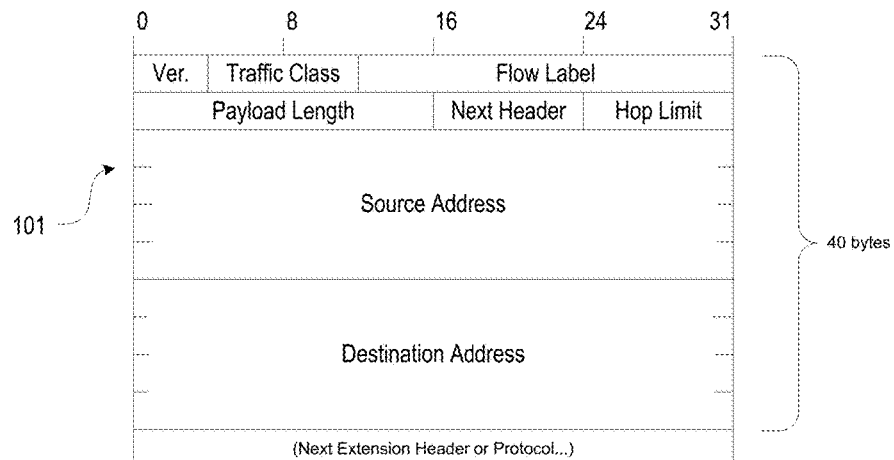
FIG. 1 illustrates an example packet header according to IPv6.

Packet-switched data commonly traverses multiple networks, such as different service operators' networks, between the origin and destination of each packet. Network operators may include any that manages one or more distinct and/or contiguous physical networks, or a portion thereof, over which Internet Protocol traffic may be sent, e.g., including but not limited to Internet multi-service operators, wireless and mobile-to-mobile service operators, as well as other Internet service providers. These operators may be referred to herein generically as an Internet Service Provider (ISP) or network operator (NO), and reference to one does not exclude the other. Many Networks operators are in the midst of upgrading resources to accommodate IPv6, defined by RFC 2460, "Internet Protocol, Version 6 (Specification)" ("RFC 2460"). As this IPv6 data traverses networks between a client and a server, each data packet 101 (shown in FIG. 1) may pass through proxy servers and load balancers, each of which may further redirect the traffic along different paths to different nodes, and ultimately to different physical and/or logical servers. A server may be any data processing or computing device capable of handling requests from one or more client devices.

Figure 2:
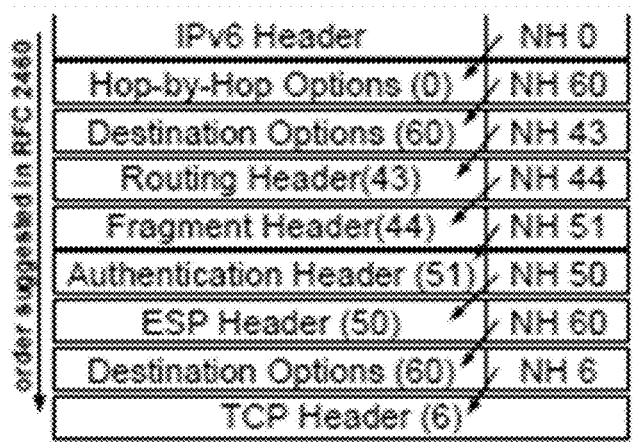
FIG. 2 illustrates example extension headers available according to IPv6.
Figure 3:
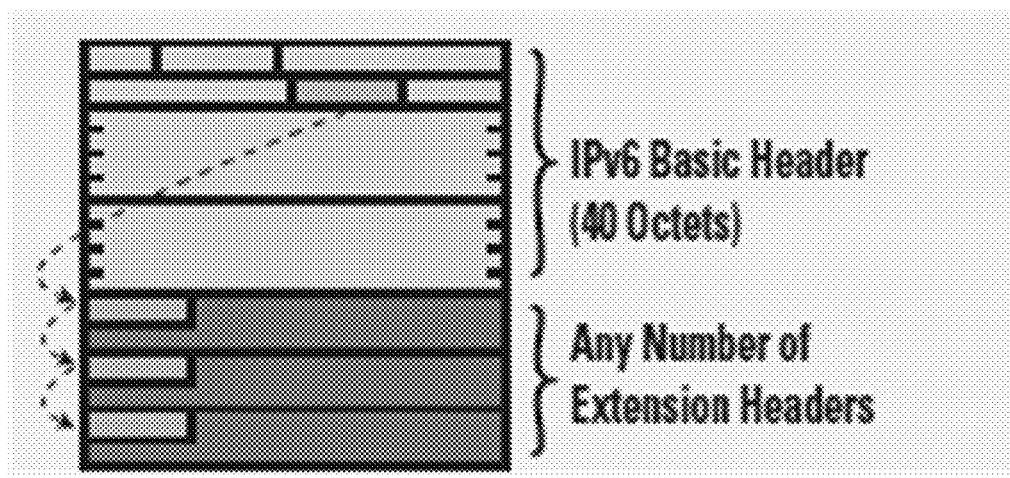
FIG. 3 illustrates example extension header chaining according to IPv6.
Figure 4:
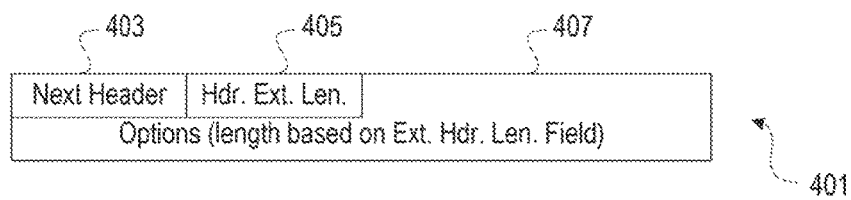
FIG. 4 illustrates an example extension header format according to IPv6.

By way of general introduction, the IPv6 header (versus the previous IPv4 header) was simplified to a fixed size of 40 bytes, and then any number of subsequent extension headers may be added. The IPv4 header had more fields and was 20 to 60 bytes in size. Additional IP options were moved from the main IPv6 header into additional headers, referred to as extension headers (EH) that may be appended to the main header as needed. The permissible EHs are shown in FIG. 2. With reference to FIG. 3 and FIG. 4, the first 8 bits 403 of each EH 401 identify the next header (another EH or upper layer protocol, such as TCP) following that header. The next 8 bits 405 specify the length of the option data field, in octets, not including the first 8 octets. The option data field 407 is a variable-length field, of length such that the complete Destination Options header is an integer multiple of 8 octets long, and contains one or more type/tag, length, value (TLV) encoded options. Extension headers may include a hop-by-hop header, destination header, routing header, fragment header, authentication header, and encapsulating security payload (ESP) header. Only the hop-by-hop header must be examined by every node on a path and, if present, the hop-by-hop header must be the first header following the main IPv6 header. Every EH must only occur once. Only the destination options extension header (DOEH) may occur twice: once before a routing EH and again before the upper layer header (after the ESP header). Further information regarding extension headers is included in RFC 2460.

Some aspects described herein introduce and define an option for the use in an IPv6 destination options extension header to assist with load balancing and session persistence. According to aspects described herein, the IPv6 destination options extension header may be used to eliminate the need for delayed binding to maintain session persistence, thereby increasing the performance of load balancers and speeding up application response time. The IPv6 destination options extension header is not encrypted when placed before the ESP header, as is intended herein. As a result, shopping-cart applications can carry forward session state information as a user transitions from unsecured (e.g., HTTP) to secured (e.g., HTTPS) requests so that all connections of the same session from a given user are sent to the same server for both HTTP and HTTPS traffic. The use of the destination options extension header as described herein can thereby eliminate the need for the use of a back-end databases, middleware, and complicated configuration of the load balancer, to achieve session persistence. As a result, a load balancer can handle more connections, each with reduced latency, than previously possible.

Figure 5:
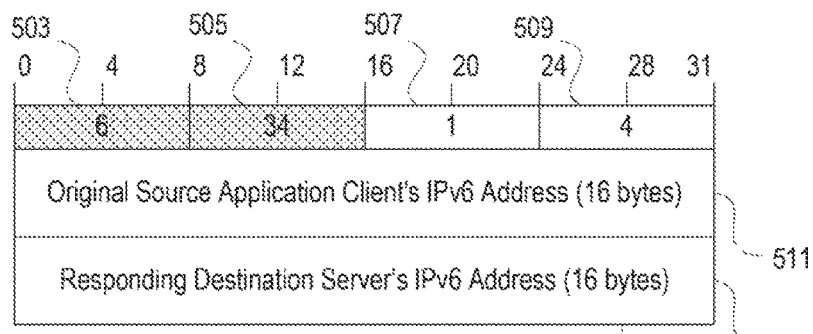
FIG. 5 illustrates an example load balancing session persistence option (LBSPO) in an IPv6 destination options extension header according to one or more aspects described herein.

With reference to FIG. 5, a destination options extension header (DOEH) 501 may be defined with a load balancing session persistence option (LBSPO). For brevity, a destination options extension header (DOEH) employing a load balancing session persistence option (LBSPO) as described herein may be referred to as an LBSPO header. LBSPO header 501 includes predefined fields 503, 505 according to RFC 2460. Namely, field 503 corresponds to field 403 and defines the next header or protocol. Field 505 corresponds to field 405 and defines the length of the data payload included with the header. Fields 507, 509, 511, and 513, collectively, correspond to field 407, and make up the payload portion of the LBSPO header 501. Field 507 specifies an option type or value. In the example illustrated in FIG. 5 the 1 octet option type 507 may have a value of 1 (binary: 00000001) identifying the load balancing session persistence option and thereby defining the extension header as an LBSPO header. Other predefined values may alternatively be used, provided that each device understands that value corresponds to the LBSPO header. Field 509 specifies the length of the option data. In the example illustrated in FIG. 5, the 1 option length 509 has a value indicating the option data is 32 bytes (binary: 00000100). When the session persistence option is used by a load balancer, the option data (or "value" within the TLV encoding) for the load balancing session persistence option is split into two fields: client 511 and server 513. Client 511 (bits 17-144) may be used to store the IPv6 address of the source application or client. For example, client 511 may be the same as the 9th-24th bytes of the original IPv6 packet header). Server 513 may be used to store the IPv6 address of the ultimate server or destination machine to which the packet is sent. However, server 513 might not get populated until that machine is known, as further described below.

Using the LBSPO header shown in FIG. 5, a load balancer (LB) may use the client 511 and other criteria to pick a server for load balancing purposes. The server chosen by the LB can then respond with a LBSPO header in its corresponding IPv6 response packet and indicate its own IPv6 address in server field 513. Subsequent request and response packets should also include the LBSPO header with both the client 511 and server 513 information unchanged. The LB may use the server 513 IPv6 address for session persistence purposes. As indicated in RFC 2460, if either the authentication header or ESP header is present, the session persistence information (in the destination options header) should be placed before those headers, not after.

Figure 6:
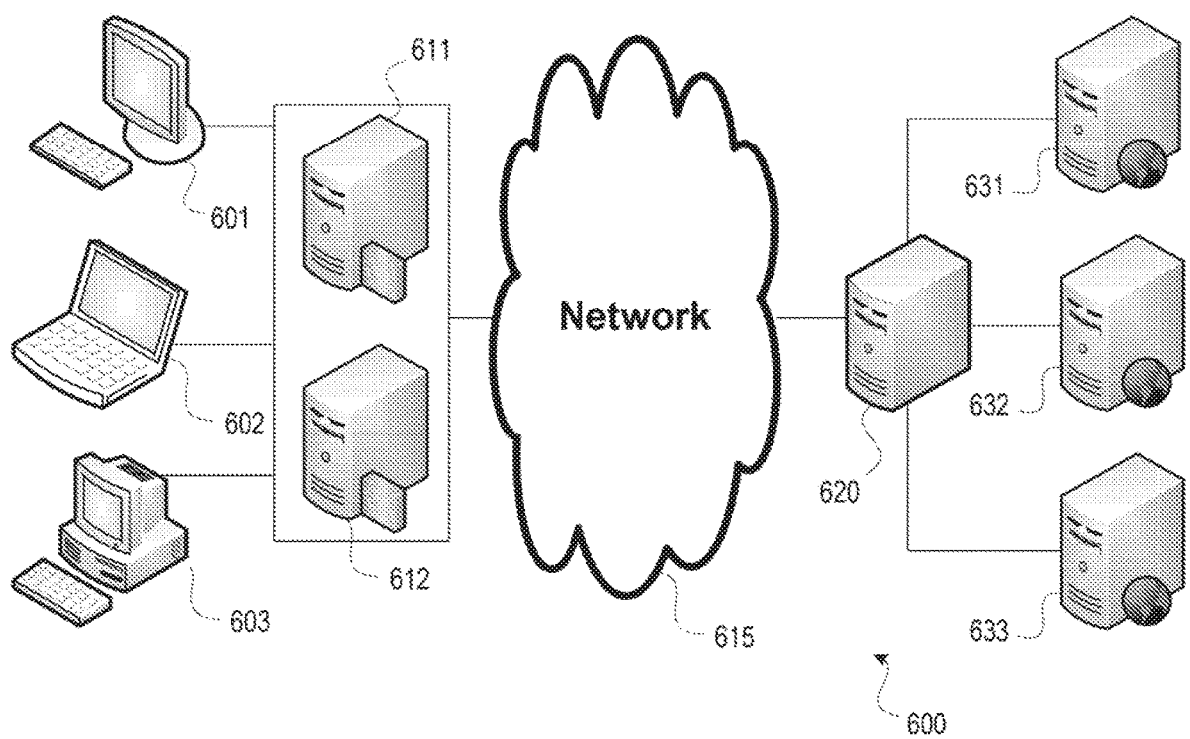
FIG. 6 illustrates an example network architecture for maintaining session persistence and performing load balancing according to one or more aspects described herein.
Figure 7:
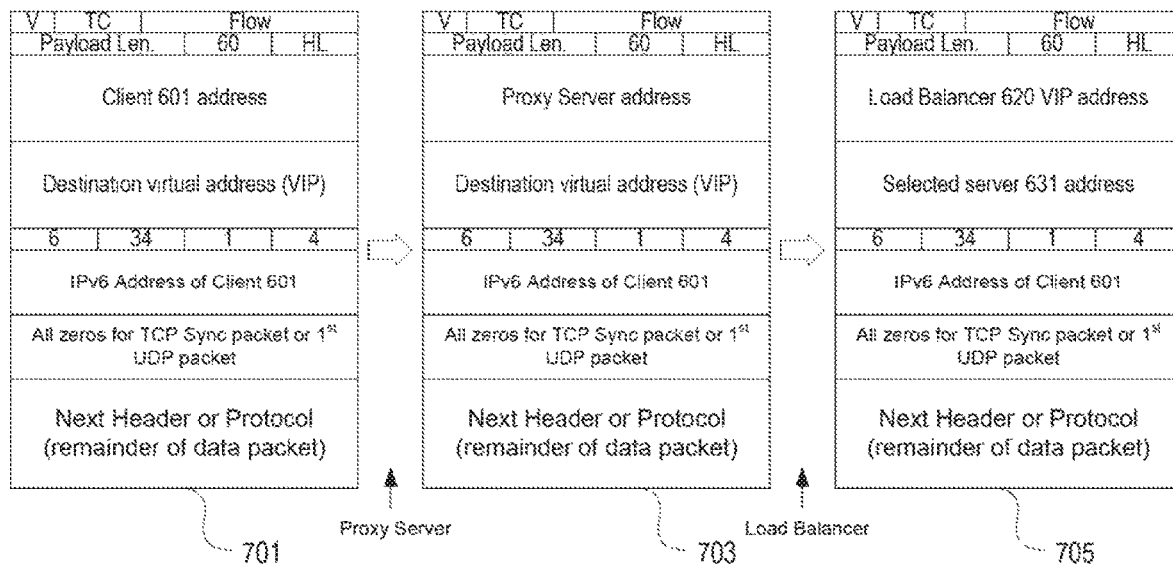
FIG. 7 illustrates example IPv6 data packets using a LBSPO destination options extension header as data packets initially progress from client to server according to one or more aspects described herein.
Figure 8:
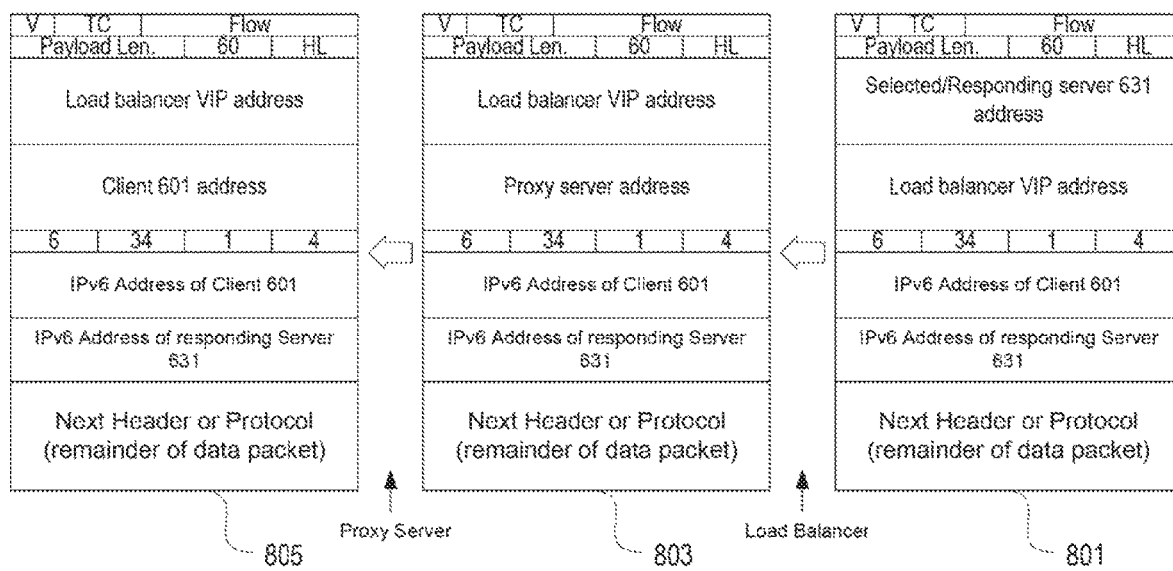
FIG. 8 illustrates example IPv6 data packets using a LBSPO destination options extension header as data packets initially progress from server to client according to one or more aspects described herein.
Figure 9:
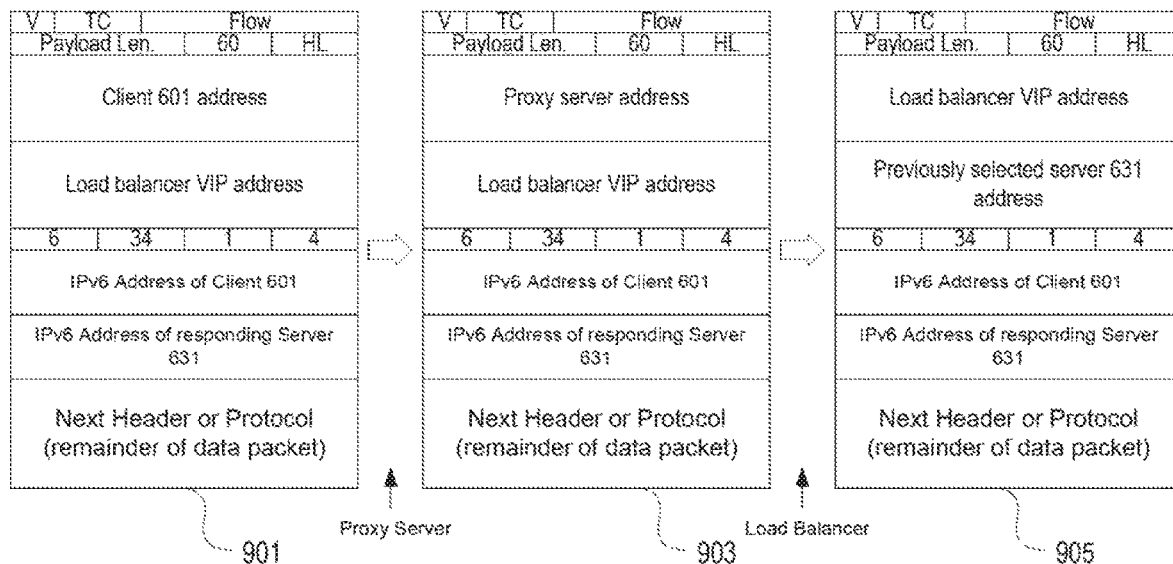
FIG. 9 illustrates example IPv6 data packets using a LBSPO destination options extension header as data packets subsequently progress from client to server according to one or more aspects described herein.
Figure 10:
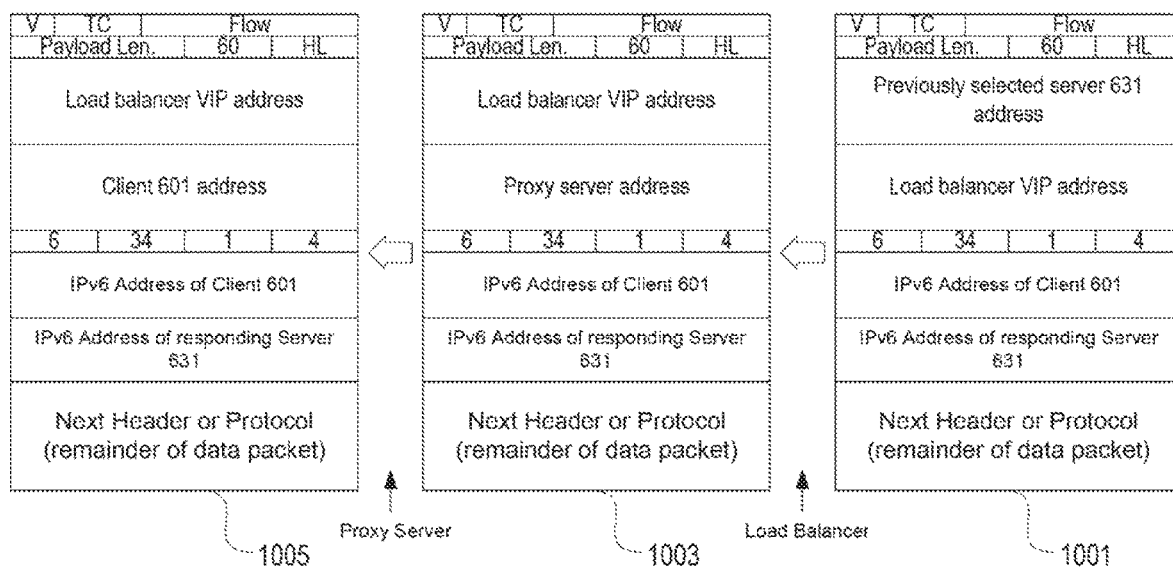
FIG. 10 illustrates example IPv6 data packets LBSPO destination options extension header as data packets subsequently progress from server to client according to one or more aspects described herein.

FIG. 6 illustrates a sample network architecture 600 that may benefit from use of the LBSPO header and other aspects described herein. Architecture 600 supports one or more client devices 601, 602, 603 (e.g., user devices, such as computing devices, smart phones, display devices, etc.) communicating with one or more ultimate server devices 631, 632, 633. However, the communications may pass through various intermediaries, hops, nodes, networks, etc., while traversing architecture 600. For example, client data packets might initially get routed to one or more proxy servers 611, 612, which then forward the communications to the server(s) via a wide area network 615, e.g., the Internet (other networks may of course be used). However, before arriving at the server 631, 632, 633, data packets might be received by a load balancer 620. Load balancer 620 determines which particular server or server instance should receive the data packet, and then forwards the data packet to the appropriate server. In some embodiments a pair of load balancers may be used in production networks for resiliency. The LBSPO header may be used in such a network setup.

In an IPv4 implementation of architecture 600, when a user opens multiple connections, the connections can be distributed across multiple proxy servers. The proxy server that makes or sends the request to the destination web site could be different for each connection. The load balancer (LB) at the destination web site identifies the IP address of the proxy server as the source IP address, because the proxy server will have replaced the original sender address with its own. If the LB performs session persistence based on the source IPv4 address, connections from the same user that are processed by different proxy servers may be sent to different application servers because the LB will view messages originating from different proxy servers as being associated with different users, thereby causing the application transaction to break. In addition, the LB may direct all connections from a given proxy server to the same application server when a single proxy server is sending communications on behalf of many different client machines, resulting in an improperly balanced traffic load. To correct this problem, prior art IPv4 systems use delayed binding as discussed above, but delayed binding hurts LB performance in terms of the number of concurrent connections a LB can support, and further adds latency to request-reply transactions.

Still with reference to FIG. 6, when the network uses IPv6 and a transaction is based on IPv6 exchanges as described herein, the original client's IPv6 address will remain persistent and made available in the LBSPO header. The LB can use the application client's IPv6 address as stored in the LBSPO header along with other load balancing criteria for initial server selection upon receipt of the first TCP SYNC packet. The LB can use responding server's IPv6 address (included in the first server response with a LBSPO header) and the client's IPv6 address for maintaining session persistence. The intermediate proxy servers will and should transparently pass the LBSPO header of each application client request and will and should also transparently pass the associated response from LBs or directly from servers (in Direct Server Return (DSR) scenarios). By using the LBSPO header with IPv6 data packets, the LB does not have to use delayed binding, and can therefore avoid costly sequence number translation that otherwise must be performed.

Figure 11:
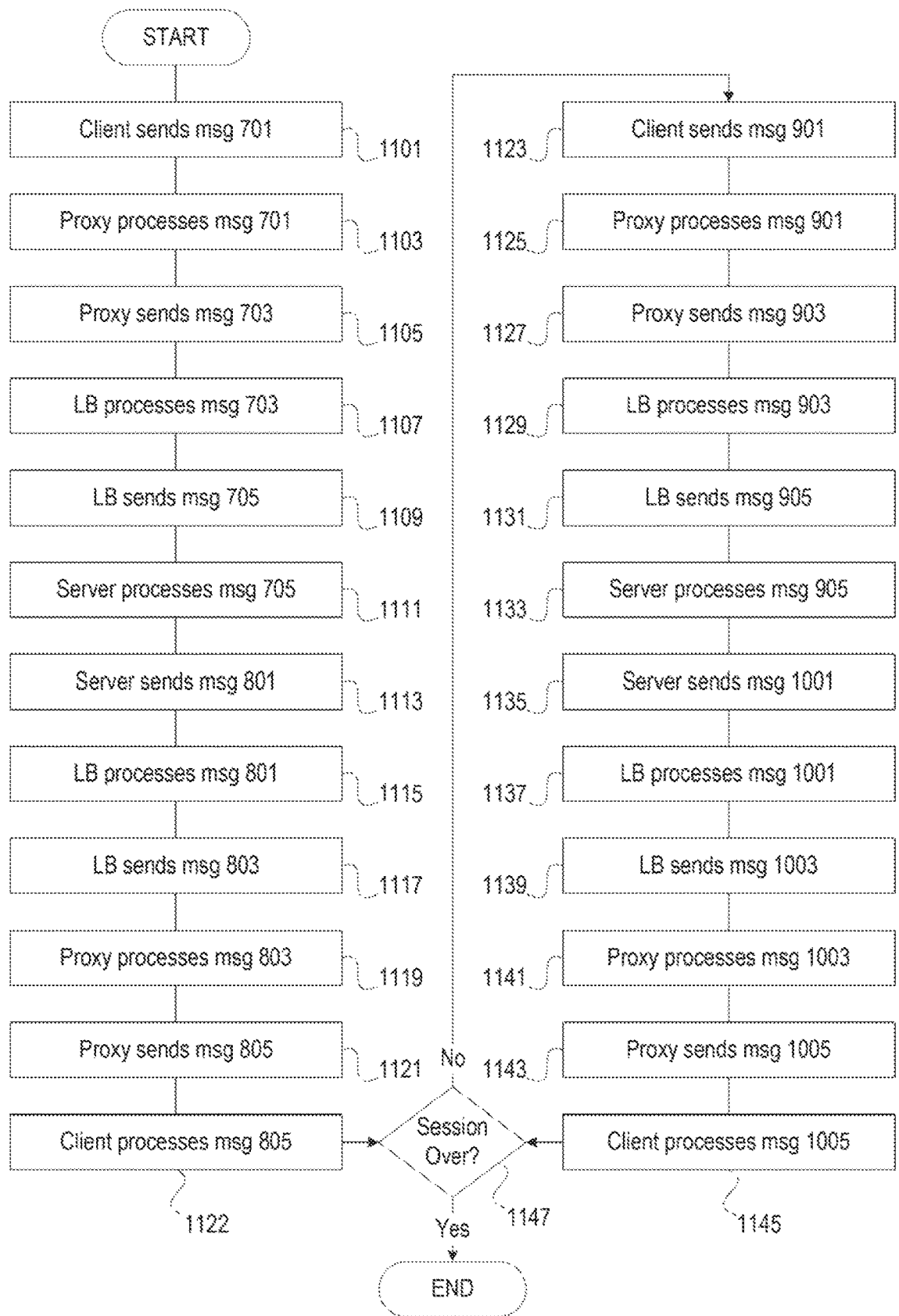
FIG. 11 illustrates a method for performing session persistence and/or load balancing according to one or more aspects described herein.

With reference to FIG. 11, and with further reference to FIGS. 7-10, a method for performing load balancing and session persistence is presented below. This illustrative method is based on the use of the IPv6 session persistence option in a destination extension header (LBSPO header), by both the client and the server, as well as all intermediaries (unless a forward compatibility option from IPv4 to IPv6 is in place). On the client side, the client application inserts its own IPv6 address in the client field 511 of the LBSPO header and leaves server field 513 all zeroes. The client application, upon receiving a first response from the server, caches the responding server's IPv6 address for all subsequent IPv6 packets exchanged during the same session. In subsequent exchanges with the server, the client application inserts in the LBSPO header both the client's and responding server's IPv6 address in fields 511, 513, respectively.

On the server side, when a server receives a first packet for a new session, the server caches the sending client address from the session persistence option for insertion in subsequent packets exchanged with that client. In the first packet response to the client, the server inserts its IPv6 address in the server field 513 of the LBSPO header, and also fills in the client field 511 with the client's IPv6 address. For all subsequent exchanges with the client, all the IPv6 packets include the LBSPO header with both the client's and the server's IPv6 addresses. The server may also check whether its own IPv6 address is the same as the data in the server field 513 of incoming IPv6 packets' LBSPO header.

Initially, in step 1101, a particular client 601 initiates communications with a desired device, application or service based on a known virtual IP address by sending data packet 701. Data packet 701 includes a sender address identifying the particular client 601, a destination address identifying the desired service or application (in this example, using a virtual IP address). Data packet 701 also includes in the "Next Header" field a value of 60, indicating that a destinations options extension header is included. The destination options extension header identifies a header length of 34, option 1 (LBSPO header), and payload length 4 (indicating 32 bytes). The payload stores a persistent client address based on the client 601, and further stores all zeros as a persistent server address because the server that will ultimately handle the client's communications is not yet known for session persistence and load balancing purposes.

In step 1103 the data packet is received and processed by a proxy server. In step 1105 the proxy server forwards data packet 703, e.g., out into a wide area network for ultimate delivery to the destination address. As shown in packet 703, the proxy server has altered the sender address in the IPv6 header to be that of the proxy server, but leaves the destination address and the LBSPO header unchanged. Any proxy server handling data packets in accordance with this method should preferably transparently pass the LBSPO header included in client-originated messages and associated responses (either from LBs or directly from servers in Direct Server Return (DSR) scenarios) without change or alteration.

In step 1107 message 703 is received and processed by a LB, which selects a particular server (e.g., server 631) to which the message should be sent. Any LB acting in accordance with this illustrative method shall read and process the LBSPO header for an IPv6 packet. For the first packet in the exchange (such as a TCP Sync packet), the IPv6 address of the client 511 is used to select a server along with other load balancing criteria. In all IPv6 packets forwarded to subtending servers, the LB includes the LBSPO header. The LBSPO header in the first packet to the selected server will contain only on application client's IPv6 address, and not the server IP address. The LBSPO header in all subsequent packets will have the IPv6 address of both the client 601 and the responding server 631. The LB also includes the LBSPO header in each response back to a proxy server or client 601, and the contents of the LBSPO header should be the same as that from the responding server 631. For all subsequent packets from client 601 for the same session, the LB preferably sends the packets to the previous responding server 631 whose IPv6 address is indicated in server field 513 of the LBSPO header.

In step 1109 the LB sends message 705 to server 631. As shown in message 705, the LB has altered the sender address to be the virtual IP (VIP) address of the LB, and has altered the destination address to be that of the selected server 631, while leaving the LBSPO header unchanged. According to one alternative, the LB might insert the address of the selected server into server field 513, rather than merely forwarding the packet and letting the server insert its own address. However, when LB performed actions are being minimized in order to maximize the number of concurrent connections that a LB can process, this action can be deferred by the LB and performed by the selected server.

In step 1111 server 631 receives and processes message 705 and prepares an appropriate response. In step 1113 server 631 sends its first reply message 801. As shown in message 801, server 631 sends the message to the LB VIP address, indicating its own address as the sender of the message. In addition, server 631 has altered the LBSPO header to indicate the address of the server 631 as the server address 513, while leaving the client address 511 unchanged.

In step 1115 the LB receives and processes message 801 and determines a next hop accordingly. In step 1117 the LB sends message 803. As shown in message 803, the LB changes the sender address to be the virtual IP address of the LB, and changes the destination address to be that of the proxy server (or proxy VIP) from which message 703 was received. The LB leaves the LBSPO header unchanged (the LBSPO header will remain unchanged throughout the remainder of session communications between client 601 and server 631).

In step 1119 the proxy server receives and processes message 803 and determines the next hop accordingly. In step 1121 the proxy server sends message 805 to client 601. As shown in message 805, the proxy server changes the destination address to be that of the originally sending client 601, while leaving other address and LBSPO header information unchanged.

In step 1122 client 601 receives and processes message 805. After processing message 805, in step 1123 client 601 sends a subsequent message 901 as part of the same session. As shown in message 901, client 601 now includes both its own address and the address of the server 631 in the LBSPO header, which remain unchanged from those included in previously received message 805 and will remain unchanged for the duration of the session between client 601 and server 631. In step 1125 the proxy server receives and processes message 901. In step 1127 the proxy server sends message 903 after having changed the sender address accordingly. Information in the LBSPO header remains unchanged.

In step 1129 the LB receives and processes message 903. In step 1131 the LB sends message 905 to server 631 after having changed the sender and destination addresses accordingly. Information in the LBSPO header remains unchanged. In step 1133 server 631 receives and processes message 905 and performs whatever action is requested by client 601.

In step 1135 server 631 sends message 1001 (for example, a response message based on message 905). Server 631 initially sets the sender address as that of server 631, sets the destination to be that of the LB's VIP address, and leaves information in the LBSPO header unchanged based on message 905. In step 1137 the LB receives and processes message 1001. In step 1139 the LB sends message 1003 after having changed the sender and destination addresses accordingly. Information in the LBSPO header remains unchanged.

In step 1141 the proxy server receives and processes message 1003. In step 1143 the proxy server sends message 1005 after having changed the destination address. Information in the LBSPO header remains unchanged. In step 1145 client 601 receives and processes message 1005. If, as determined in step 1147, further communications between client 601 and server 631 are needed, e.g., the session is ongoing, then the method returns to step 1123 where the client 601 sends another message to server 631. Otherwise, the method may terminate.

The method may be altered from that described above while maintaining same or similar functionality. Multiple steps may be combined, reordered, or split into lower levels of granularity, without altering the load balancing and session persistence capabilities described herein. For example, step 1147 may be skipped after step 1122 (proceeding directly to step 1123), based on the assumption that at least one subsequent set of messages will be required after the initial session is established. Other alternatives may also be possible.

According to one alternative, the payload 407 of one or more LBSPO headers may be encrypted such that only authorized nodes (e.g., client, server, approved intermediaries) can decrypt the LBSPO header to identify the client and server addresses included therein. By encrypting the LBSPO header payload, packing sniffing software and/or other malware may be prevented from detecting an endpoint IP address which could be used in a nefarious attempt to benefit from intercepted communications.

With reference to FIG. 12, a load balancing node may maintain session persistence while performing load balancing based on the methods and systems described above. FIG. 12 illustrates a sample session table maintained by a LB, e.g., by LB 620, during administration of 6 incoming packets. Server selection is based on existing load balancing techniques and/or algorithms when no server information is present in a LBSPO header. When server information is present in a LBSPO header, a server is selected based on the included server information. The information in FIG. 12 is based on traffic having gone through an ISP or enterprise proxy server before reaching the LB (as evidenced by the Source being Proxy 1 for each connection). However, that need not be the case. In addition, FIG. 12 does not include second packets sent from clients that acknowledge the TCP-Sync response from a server during the TCP 3-way handshake process.

As shown in FIG. 12, a first packet is received from Proxy 1 identifying a destination of VIP1 with no port ID (e.g., a TCP Sync packet), and including a LBSPO header with client=C1 (e.g., client 601) and server=0. Based on no server indicated, the LB assigns a server based on its load balancing algorithm(s) otherwise in place, and sends packet 1 to SERV1 (e.g., client 631). The LB later receives a second packet from Proxy 1 identifying a destination of VIP1 on port 80 (HTTP), and including a LBSPO header with client=C1 and server=SERV1. Based on the LBSPO header, the LB sends the message to SERV1.

The LB next receives a third packet from Proxy 1 identifying a destination of VIP1 on port 21 (FTP), including a LBSPO header with client=C1 and server=0. Even though client C1 has previously communicated with a server managed by the LB, the LBSPO header indicates server=0. This may occur, for example, where a server does not return its address information in the server field of a LBSPO header. Based on no server being indicated in the LBSPO header, the LB selects a server based on its load balancing algorithm(s), and forwards the packet to SERV2 (e.g., server 632).

The LB later receives a fourth packet from Proxy 1 identifying a destination of VIP1 on port 443 (HTTPS). The fourth packet may be a result of a user entering a secure mode, e.g., a user selecting a secure checkout feature on a website, and thereby switching from HTTP to HTTPS. The fourth packet includes a LBSPO header with client=C1 and server=SERV1. Based on the LBSPO header, the LB forwards the message to SERV1.

The LB receives a fifth packet from Proxy 1 identifying a destination of VIP2 with no port ID (e.g., a TCP Sync packet), but including a LBSPO header having client=C2 (e.g., client 602) and server=0. Based on no server being indicated in the LBSPO header, the LB selects a server based on its load balancing algorithm(s), and sends the packet to SERV3 (e.g., server 633). When the LB subsequently receives a sixth packet from Proxy 1 identifying a destination of VIP2 on port 80 (HTTP), and having a LBSPO header identifying client=C2 and server=SERV3, the LB forwards the message to SERV3.

The LB may or may not perform any security checks when packets are received specifying a certain server. For example, one or more malicious nodes and/or users might attempt a denial-of-service (DoS) type attack by flooding a particular server with data packets. In doing so, the malicious group might include the server address in the server field 513 of the LBSPO header. However, because each LB typically performs load balancing for up to 20 servers or more, even if the DoS attack on a single server were successful, the remaining servers would be unaffected. The owner of the LB therefore is not typically concerned with a DoS attack on a single end server. A bigger problem is a denial of service attack on the VIP address of the service, in which case the LB would respond to such an attack as it would prior to implementation of the LBSPO header.

The LBSPO header may be used in large-scale deployments on IPv6 networks, e.g., in large data centers that server as a foundation of information-driven businesses. By using a LBSPO header with IPv6 enabled client devices, IPv6 enabled servers and IPv6 enabled load balancers, a data center can more efficiently administer connections with a larger base of users.

The above description is not meant to be limiting the implementation of session persistence information in a destination options extension header. Rather, the above is illustrative only. Other alternative implementations may be used. For example, according to one alternative, the order of the client and server fields in a LBSPO header could be reversed. Other information may be included in the session persistence payload in addition to or in place of the client and server addresses. In one example, instead of client and server addresses, random numbers may be used to preserve secrecy of client and/or server addresses. The random numbers may be specified to be of a length or complexity such that the probability of two machines generating the same random number is minimized. Sessions could then be maintained by matching the random number generated by a client application with the random number generated by the assigned server for that session. The randomness of the number is unique enough so that load balancers in an IPv6 enabled network can perform load balancing upon the arrival of a first packet from a proxy server in its data path. However, the server preferably uses its IPv6 address, instead of random number, for the 2nd field of the LBSPO, because the use of a random number in the server field would make it difficult for the load balancer to identify the server without a priori arrangement, and such an a priori arrangement is preferably avoided to simplify the operations that must be performed by the load balancer.

In other alternatives, usernames or other unique ID of a user, and/or an encrypted signed data field (such as a hash), could be used instead of IPv6 addresses, and the length of the LBSPO header payload could be altered accordingly. The encrypted signed data field may be inserted by a client to prove to a server (or LB) that the client is the same client as that which the server is already communicating in another session. Other alternatives may also be used.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a tangible computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a load balancer, a first packet comprising a first header;
   determining, based on the first header not indicating a server identifier for the first packet to be sent and based on one or more load balancing criteria, a server from a plurality of servers;
   sending the first packet to the server;
   receiving a second packet comprising a second header;
   determining, based on the second header, that the second packet is associated with a same session as the first packet; and
   sending, based on a determination that the second packet is associated with the same session as the first packet, the second packet to the server.

2. The method of claim 1, wherein at least one of the first header and the second header is a destination options extension header (DOEH).

3. The method of claim 2, wherein the first packet is a Hyper Text Transfer Protocol (HTTP) packet.

4. The method of claim 3, wherein the second packet is a Hyper Text Transfer Protocol Secure (HTTPS) packet.

5. The method of claim 1, wherein the first header is destination options extension header (DOEH) and wherein the server identifier of the first header is null.

6. The method of claim 1, wherein the second header is a destination options extension header (DOEH), and wherein a server identifier of the second header indicates the server.

7. The method of claim 1, wherein the first header is a destination options extension header (DOEH), wherein the first packet further comprises an Internet Protocol (IP) header, and wherein sending the first packet comprises:
   modifying the first header to generate a modified IP header; and
   sending the first packet comprising the modified IP header and the DOEH.

8. The method of claim 1, further comprising:
   receiving, from the server, a third packet comprising:
      an Internet Protocol (IP) header; and
      a destination options extension header (DOEH);
   modifying the IP header to generate a modified IP header; and
   sending the third packet comprising the modified IP header and the DOEH.

9. The method of claim 8, wherein the first packet is received by the load balancer from a proxy server, and wherein modifying the IP header comprises:
   modifying a destination address field of the IP header to indicate the proxy server.

10. An apparatus comprising:
    one or more processors; and
    memory storing instructions that, when executed by the one or more processors, cause the apparatus to:
       receive, from a first computing device, a Hyper Text Transfer Protocol (HTTP) packet;
       associate the HTTP packet with a session;
       send the HTTP packet to a server;
       receive, from a second computing device, a Hyper Text Transfer Protocol Secure (HTTPS) packet;
       determine, based on a header of the HTTPS packet, that the HTTPS packet is associated with the session; and send, based on a determination that the HTTPS packet is associated with the session, the HTTPS packet to the server.

11. The apparatus of claim 10, wherein the header is a destination options extension header (DOEH), and wherein the HTTPS packet further comprises an Internet Protocol (IP) header.

12. The apparatus of claim 11, the memory storing instructions that, when executed by the one or more processors, cause the apparatus to determine, based on the header of the HTTPS packet, that the HTTPS packet is associated with the session by:
  determining that a server address field of the DOEH indicates the server.

13. The apparatus of claim 10, the memory storing instructions that, when executed by the one or more processors, cause the apparatus to:
  determine that a server address field of a destination options extension header (DOEH) of the HTTP packet is null; and
  select, from a plurality of servers and based on a client address field of the DOEH, the server.

14. A system comprising:
  a load balancer configured to:
    receive a first packet comprising a first header;
    selecting, based on the first header not indicating a server identifier for the first packet to be sent and based on one or more load balancing criteria, a server from a plurality of servers;
    send the first packet to the server;
    receive a second packet comprising a second header;
    determine, based on the second header, that the second packet is associated with a same session as the first packet; and
    send the second packet to the server; and
  a server configured to:
    receive, from the load balancer, the first packet and the second packet; and
    send, to the load balancer, one or more packets.

15. The system of claim 14, wherein the first header is a destination options extension header (DOEH) and wherein the load balancer is configured to select the server by:
  determining that the server identifier of the first header is null; and
  selecting, further based on a client address field of the first header, the server.

16. The system of claim 14, wherein the second header is a destination options extension header (DOEH), and wherein the load balancer is configured to determine, based on the second header, that the second packet is associated with the same session as the first packet by:
  determining that a server identifier of the second header indicates the server.

17. The system of claim 14, wherein the first packet is a Hyper Text Transfer Protocol (HTTP) packet.

18. The system of claim 17, wherein the second packet is a Hyper Text Transfer Protocol Secure (HTTPS) packet.

19. The system of claim 14, wherein the load balancer is further configured to:
  receive, from the server, a third packet comprising:
    an Internet Protocol (IP) header; and
    a destination options extension header (DOEH);
  modify the IP header to generate a modified IP header; and
  send the third packet comprising the modified IP header and the DOEH.

20. The system of claim 14, wherein the first header is a destination options extension header (DOEH), wherein the first packet further comprises an Internet Protocol (IP) header, and wherein the load balancer is configured to send the first packet by:
  modifying the first header to generate a modified IP header; and
  sending the first packet comprising the modified IP header and the DOEH.

21. The system of claim 20, wherein the load balancer is configured to send the first packet by:
  modifying the server identifier of the first packet to indicate the server.

* * * * *

UNITED STATES PATENT AND TRADEMARK OFFICE
CERTIFICATE OF CORRECTION

PATENT NO. : 10,630,817 B2
APPLICATION NO. : 15/720727
DATED : April 21, 2020
INVENTOR(S) : Chia J. Liu It is certified that error appears in the above-identified patent and that said Letters Patent is hereby corrected as shown below:

In the Specification

Detailed Description, Column 5, Line 63:
After "1", please insert --octet--

Signed and Sealed this
Twentieth Day of December, 2022

Katherine Kelly Vidal
*Director of the United States Patent and Trademark Office*